United States Patent [19]

Meixner et al.

[11] Patent Number: 4,921,883

[45] Date of Patent: May 1, 1990

[54] UNSATURATED POLYESTER RESINS, A PROCESS FOR THEIR PREPARATION AND COMPOSITIONS CONTAINING THESE POLYESTER RESINS

[75] Inventors: Jürgen Meixner, Krefeld; Wolfgang Kremer, Kerken; Manfred Müller, Erkelenz, all of Fed. Rep. of Germany

[73] Assignee: Bayer Aktiengesellschaft, Leverkusen, Fed. Rep. of Germany

[21] Appl. No.: 169,967

[22] Filed: Mar. 18, 1988

[30] Foreign Application Priority Data

Mar. 28, 1987 [DE] Fed. Rep. of Germany ....... 3710428

[51] Int. Cl.$^5$ .................. C08F 2/50; C08F 283/01; C08G 63/54
[52] U.S. Cl. .................................. 522/107; 525/40; 528/298
[58] Field of Search .................. 522/107; 528/298

[56] References Cited

U.S. PATENT DOCUMENTS

| | | | |
|---|---|---|---|
| 3,489,707 | 1/1970 | Fry | 525/265 |
| 3,554,886 | 1/1971 | Colomb et al. | 522/90 |
| 3,585,254 | 6/1971 | Buck | 528/298 |
| 3,784,492 | 1/1974 | Colomb et al. | 522/89 |
| 3,836,509 | 9/1974 | Colomb et al. | 522/104 |
| 4,134,814 | 1/1979 | DePoortere | 522/107 |
| 4,227,978 | 10/1980 | Barton | 522/107 |
| 4,462,926 | 7/1984 | Prater | 528/288 |

FOREIGN PATENT DOCUMENTS

| | | |
|---|---|---|
| 0097909 | 1/1984 | European Pat. Off. . |
| 1901078 | 1/1969 | Fed. Rep. of Germany . |
| 2003121 | 1/1970 | Fed. Rep. of Germany . |
| 2412556 | 9/1975 | Fed. Rep. of Germany . |
| 42334 | 9/1962 | Luxembourg . |
| 1490762 | 11/1977 | United Kingdom . |
| 1515272 | 6/1978 | United Kingdom . |

OTHER PUBLICATIONS

Bjorksten, "Polyesters . . . ", Reinhold, 1956, pp. 161 and 170.
Martens, "Alkyd Resins", Reinhold, 1961, pp. 38-41.
Chemical Abstracts, 106: 34765a (1987).

Primary Examiner—Lewis T. Jacobs
Assistant Examiner—Arthur H. Koeckert
Attorney, Agent, or Firm—Connolly and Hutz

[57] ABSTRACT

Unsaturated polyester resins having an acid number of from 0 to 50 and a hydroxyl number of from 10 to 150 which are composed of 0.6 to 0.8 moles of groups derived from maleic and/or fumaric acid, 0.2 to 0.4 moles of groups derived from norbornene dicarboxylic acid, 0.6 to 0.8 moles of groups derived from ethylene and/or propylene glycol, 0.2 to 0.4 moles of groups derived from diethylene glycol, 0.1 to 0.2 moles of groups derived from benzylalcohol and/or benzoic acid and 0 to 0.2 moles of groups derived from other alcohols, a process for their manufacture by a solvent-free or azeotropic esterification of said monomers and compositions which can be cured under influence of UV radiation, containing from 40 to 80 parts by weight of said polyester resins, from 20 to 60 parts by weight of styrene from 0.5 to 5 parts by weight of at least one photoinitiator and optionally known auxiliary agents and additives.

2 Claims, No Drawings

UNSATURATED POLYESTER RESINS, A PROCESS FOR THEIR PREPARATION AND COMPOSITIONS CONTAINING THESE POLYESTER RESINS

BACKGROUND OF THE INVENTION:

This invention relates to new unsaturated polyester resins based on selected starting materials, to a process for their preparation and to compositions containing these polyester resins as essential component.

Unsaturated polyester resins have long been known as binders for coatings cured by UV radiation. Thus according to DE-AS 1 694 149, mixtures of unsaturated polyesters and polymerisable monomers may be cured by UV radiation with the addition of certain benzoin compounds. Due to the inhibiting action of atmospheric oxygen, lacquers based on these systems are frequently not sufficiently hardened on the surface and therefore cannot be sanded down but good rubbing down of the layer of primer is essential for obtaining lacquer film surfaces of good appearance on wood.

The method of preventing the inhibitory action of air on the conventional hardening of lacquers with peroxide by adding paraffin ("paraffin polyesters") which become deposited on the surface in the process of gelling is only applicable with reservations because the thermal energy emitted from the UV radiators prevents the formation of a protective film of paraffin. In such cases, it is necessary first to pass the material through a so called pregelling zone.

Unsaturated polyesters containing α,β-unsaturated dicarboxylic acid groups and allyl ether and/or polyalkylene glycol groups ("gloss polyesters") do not require paraffin for curing the surface of the lacquer film since the ether groups release an auto-oxidative drying process. UV-curing of such resins containing allyl ether groups (DE-OS 2 113 998) or polyalkylene glycol groups (DE-OS 3 010 428) results in lacquer films which are easily rubbed down in much the same way as conventional curing but the reactivity of such resins is often too low to ensure sufficient processing speeds.

It was therefore an object of the present invention to provide new polyester resins which do not have the disadvantages mentioned above, i.e. which are in particular suitable for the preparation of coating compounds which can be cured by UV radiation and combine good levelling with rapid curing and give rise to lacquer films with surfaces which can easily be rubbed down.

It was surprisingly found that this problem could be solved by providing the polyester resin according to the invention described in detail below or mixtures containing these polyester resins as essential component.

SUMMARY OF THE INVENTION

The present invention thus relates to unsaturated polyester resins having an acid number of from 0 to 50 and a hydroxyl number of from 10 to 150, characterised in that they consist of 0.6 to 0.8 of maleic and/or fumaric acid groups,
0.2 to 0.4 mol of norbornene dicarboxylic acid groups,
0.6 to 0.8 mol of ethylene- and/or propylene-glycol groups
0.2 to 0.4 mol of diethylenen glycol groups,
0.1 to 0.2 mol of benzylalcohol and/or benzoic acid groups and
0 to 0.2 mol of other alcohol groups.

The present invention also relates to a process for the preparation of these polyester resins, characterised in that a mixture of 0.6 to 0.8 mol of maleic acid maleic acid anhydride and/or fumaric acid,
0.2 to 0.4 mol of norbornene dicarboxylic acid
0.6 to 0.8 mold of ethylene- and/or propylene-glycol,
0.2 to 0.4 mol of diethylene glycol,
0.1 to 0.2 mol of benzylalcohol and/or benzoic acid and
0 to 0.2 mol of other monohydric or dihydric alcohols
is subjected to a solvent free or azeotropic esterification reaction in a known manner.

The present invention also relates to compositions curable under the influence of UV radiation, containing (a) 40 to 80 parts by weight of at least one ethylenically unsaturated polyester resin,
(b) 20 to 60 parts by weight of styrene,
(c) 0.1 to 5 parts by weight of at least one photoinitiator and
(d) optionally known auxiliary agents and additives, characterised in that component a) is a polyester resin having an acid number of from 0 to 50 and a hydroxyl number of from 10 to 150 and consisting of 0.6 to 0.8 mol of maleic and/or fumaric acid groups,
0.2 to 0.4 mol of norbornene dicarboxylic acid groups,
0.6 to 0.8 mol of ethylene and/or propylene glycol groups,
0.2 to 0.4 mol of diethylene glycol groups,
0.1 to 0.2 mol of benzyl alcohol and/or benzoic acid groups, and 0 to 0.2 mol of other alcohol groups.

DETAILED DESCRIPTION OF THE INVENTION

The polyester resins according to the invention have an acid number of from 0 to 50, preferably from 5 to 40, and a hydroxyl number from 10 to 150, preferably from 10 to 130. Their number average molecular weight determined by vapour pressure osmometry is generally in the range of from 300 to 5000, preferably from 500 to 2000.

Preparation of the polyester resins according to the invention is carried out by known methods, e.g. by solvent free or azeotropic esterification of the alcohols and acids or their esterifiable derivatives; see "Methoden der organischen Chemie" (Houoben-Weyl), 4th edition volume 14/2, Georg Thieme Verlag, Stuttgart 1961, pages 1 to 5, 21 to 33, 40 to 44.

For preparing the polyester resins according to the invention, the starting materials mentioned above are reacted together in the molar ratios indicated, the norbornene dicarboxylic acid being optionally produced in situ by the introduction of dicyclopentadiene in addition to fumaric acid in the esterification reaction.

The other alcohols, which may be added in quantities of from 0 to 0.2 mol for the preparation of the polyester resins, are monohydric alcohols with 1 to 12 carbon atoms or dihydric alcohols with 4 to 10 carbon atoms, such as, for example, methanol, ethanol, n-hexanol, isooctanol, n-decanol, butyl diglycol, tetramethylene diol, pentamethylene diol or hexamethylene diol.

To protect the polyester resins against premature polymerisation, it is often advisable to add known polymerisation inhibitors or anti-oxidants at the stage of preparation of the polyesters. These inhibitors or antioxidants should be added in amounts of from 0.001 to 0.1% by weight, based on the weight of the starting materials used for the preparation of the polyesters, and they may consist, for example, of the compounds conventionally used for this purpose, such as quinones, hydroquinones, copper compounds, phosphites, amines or phenols.

The photoinitiators c) may consist of the compounds conventionally used for this purpose, e.g. those described in the monograph by J. Korsar, Light-Sensitive Systems, J. Wiley & Sons, New York—London—Sydney, 1965.

Benzoin ethers such as benzoin isopropyl ether, benzil ketals such as benzil dimethyl ketal and hydroxyalkyl phenones such as 2-hydroxy-2-methyl-1-phenyl-propan-1-one are also very suitable.

The mixtures according to the invention may contain additional additives (d) such as, inter alia, inhibitors, metal compounds, carriers and fillers as well as thixotropic agents, levelling agents and smoothing and delustering agents.

The mixtures according to the invention are suitable in particular as coating compounds for suitable substrates such as, in particular, wood, paper, plastic foils and cardboard. The coating compounds may be worked up by any of the conventional methods employed in lacquer technology, such as casting, spraying or roller application.

Curing of the coatings prepared according to the invention is most suitably carried out under high energy radiation, for example using high pressure radiators (mercury vapour lamps). Although low energy fluorescent lamps may also be used, the speed of curing obtained with these lamps is generally insufficient for practical use, for example for short cycle manufacturing of furniture.

The percentages given in the following examples are all percentages by weight.

EXAMPLES

The preparation of polyester resins 1 to 7 was carried out by solvent free condensation in a nitrogen atmosphere at a temperature of 150° to 200° C. after the addition of 0.02% of hydroquinone.

After completion of the reaction, the polyester resins obtained were dissolved in styrene at 100° C. to form 70% solutions.

| Mol | Examples according to the invention | | Comparison Examples | | | | |
|---|---|---|---|---|---|---|---|
| | 1 | 2 | 3 | 4 | 5 | 6 | 7 |
| Maleic acid | 0.7 | 0.7 | 0.7 | 0.7 | 0.7 | 0.5 | 0.7 |
| Phthalic acid | — | — | — | 0.3 | 0.3 | — | — |
| Tetrahydrophthalic acid | — | — | 0.3 | — | — | — | — |
| Norbornenedicarboxylic acid | 0.3 | 0.3 | — | — | — | 0.5 | 0.3 |
| Ethylene glycol | 0.7 | 0.5 | 0.7 | — | 0.5 | 0.7 | 0.7 |
| Diethylene glycol | 0.3 | 0.2 | 0.3 | — | 0.5 | 0.3 | 0.4 |
| Propylene glycol | — | 0.3 | — | 1.1 | — | — | — |
| Benzyl alcohol | 0.2 | 0.1 | 0.1 | — | — | — | — |
| Trimethylol propane diallyl ether | — | — | — | — | 0.1 | 0.1 | — |

The acid numbers of the 70% solutions of the products in styrene were in the range of 10 to 30 mg KOH/g, the hydroxyl numbers were from 10 to 60 mg KOH/g, and the viscosities were about 1200 mPa.s (23° C.).

After the addition of 2 parts by weight of benzil dimethyl ketal and 2 parts by weight of a commercial levelling agent (1% solution in toluene of a slicone oil, ®Baysilon Lacquer Additive-PL, manufacturer: Bayer AG, Leverkusen) the mixtures were cast on wood to form layers 250 μm in thickness. Curing was carried out under 2 IST radiators (impulse radiator of IST-Strahlentechnik power 80 watt/cm, distance of radiators 20 cm) at a processing speed of 4 m/min.

The following table illustrates the excellent grindability of products 1 and 2 according to the invention.

| | Examples according to the invention | | Comparison Examples | | | | |
|---|---|---|---|---|---|---|---|
| | 1 | 2 | 3 | 4 | 5 | 6 | 7 |
| Surface | Hard | Hard | Hard | Tacky | Soft | Tacky | Craters/cloudy |
| Grindability | Very good | Very good | Poor | None | None | None | Good |

Although the polyester of comparison Example 3 (without norbornene dicarboxylic acid) results in a hard lacquer film surface, the surface is difficult to grind (abrasive paper gets clogged).

Polyester 4, which is a typical repesentative of the so called paraffin polyesters, only gives rise to tacky surfaces if hardened without the addition of paraffin.

Polyester 5 which is a representative of the so called gloss polyester resins (containing allyl ether groups) shows insufficient curing at this processing speed.

Example 6 shows that resins in which the norbornene dicarboxylic acid content is too high are not sufficiently reactive.

Example 7 shows that benzylic groups are necessary in the polyester because otherwise surface defects occur in the lacquer film.

We claim:

1. Unsaturated polyester resins having an acid number of from 0 to 50 and a hydroxyl number from 10 to 150, characterised in that they consist of
   0.6 to 0.8 mol of maleic acid groups, fumaric acid groups or a mixture thereof,
   0.2 to 0.4 mol of norbornene dicarboxylic acid groups,
   0.6 to 0.8 mol of ethylene glycol groups, propylene glycol groups or a mixture thereof,
   0.2 to 0.4 mol of diethylene glycol groups,
   0.1 to 0.2 mol of benzyl alcohol groups, benzoic acid groups or a mixture thereof and 0 to 0.2 mol of monohydric or dihydric alcohol groups or a mixture thereof.

2. Compositions which can be cured under the influence of UV radiation, containing
   (a) 40 to 80 parts by weight of at least one ethylenically unsaturated plyester resin,
   (b) 20 to 60 parts by weight of styrene,
   (c) 0.1 to 5 parts by weight of at least one photoinitiator and
   (d) optionally known auxiliary agents and additives, characterised in that component a) is a polyester resin with an acid number of from 0 to 50 and a hydroxyl number from 10 to 150 and consists of
   0.6 to 0.8 ol of maleic acid groups, fumaric acid groups or a mixture thereof,
   0.2 to 0.4 mol of norbornene dicarboxylic acid groups,
   0.6 to 0.8 mol of ethylene glycol groups, propylene glycol groups or a mixture thereof,
   0.2 to 0.4 mol of diethylene glycol groups
   0.1 to 0.2 mol of benzyl alcohol groups benzoic acid groups or a mixture thereof an
   0 to 0.2 mol of monohydric or dihydric alcohol groups or a mixture thereof.

* * * * *